United States Patent
Hirano

(10) Patent No.: US 9,772,039 B2
(45) Date of Patent: Sep. 26, 2017

(54) HYDRAULIC PRESSURE CONTROL VALVE

(71) Applicant: DENSO CORPORATION, Kariya, Aichi-pref. (JP)

(72) Inventor: Akinori Hirano, Nagoya (JP)

(73) Assignee: DENSO CORPORATION, Kariya (JP)

( * ) Notice: Subject to any disclaimer, the term of this patent is extended or adjusted under 35 U.S.C. 154(b) by 316 days.

(21) Appl. No.: 14/045,848

(22) Filed: Oct. 4, 2013

(65) Prior Publication Data

US 2014/0137968 A1  May 22, 2014

(30) Foreign Application Priority Data

Nov. 19, 2012 (JP) .................. 2012-252879

(51) Int. Cl.
*F16K 11/07* (2006.01)
*F16K 27/04* (2006.01)

(52) U.S. Cl.
CPC ............ *F16K 11/07* (2013.01); *F16K 27/041* (2013.01); *Y10T 137/86879* (2015.04)

(58) Field of Classification Search
CPC ................... F16K 11/07; F16K 27/041; Y10T 137/86879; Y10T 137/8671; Y10T 137/86694; Y10T 137/8667; Y10T 137/8622
USPC ............ 137/625.48, 625.69, 625.25, 625.65, 137/625.67
See application file for complete search history.

(56) References Cited

U.S. PATENT DOCUMENTS

2010/0243085 A1\* 9/2010 Van Weelden ...... F15B 13/0402
137/544

FOREIGN PATENT DOCUMENTS

| JP | H3-025078 U | | 3/1991 | |
| JP | H10-289018 A | | 10/1998 | |
| WO | WO 2011008428 | * | 1/2011 | ......... F16H 61/0251 |

OTHER PUBLICATIONS

Notice of Rejection dated Oct. 21, 2014 in corresponding JP Application No. 2012-252879 (with English translation).

\* cited by examiner

*Primary Examiner* — Michael R Reid
*Assistant Examiner* — Paul J Gray

(57) ABSTRACT

A hydraulic pressure control valve is equipped to a cavity to control a communication state between a supply port and an outlet port to supply hydraulic fluid from the supply port through the outlet port to a controlled object. A tubular sleeve has a first port and a second port communicating with the supply port and the outlet port, respectively. A spool includes a land supported by the sleeve slidably in an axial direction to form a hydraulic chamber with an inner circumferential periphery of the sleeve. The spool is displaced in the axial direction to cause the land to control a communication state between the first port and the second port through the hydraulic chamber. A supply-side hydraulic passage is connected with the hydraulic chamber through multiple outflow holes to conduct hydraulic fluid from the hydraulic chamber through the second port to the outlet port.

13 Claims, 10 Drawing Sheets

COMPARATIVE EXAMPLE

COMPARATIVE EXAMPLE

HYDRAULIC PRESSURE CONTROL VALVE

CROSS REFERENCE TO RELATED APPLICATION

This application is based on reference Japanese Patent Application No. 2012-252879 filed on Nov. 19, 2012, the disclosure of which is incorporated herein by reference.

TECHNICAL FIELD

The present disclosure is related to a hydraulic pressure control valve configured to supply hydraulic fluid into a controlled object of hydraulic pressure and to drain hydraulic fluid from the controlled object, thereby to control a hydraulic pressure in the controlled object. The controlled object may be, for example, a continuously variable transmission device.

BACKGROUND

Conventionally, a hydraulic pressure control valve is employed, for example, in a body of an automatic transmission device of a vehicle to control a hydraulic pressure to be applied to components in the automatic transmission device. The automatic transmission device has a body having a tubular cavity to which a hydraulic pressure control valve is equipped. The tubular cavity has a supply port, an outlet port, and a drain port. The supply port is connected to a supply source of hydraulic fluid. The outlet port is connected to a hydraulic pressure chamber of the controlled object. The drain port is connected to a drain destination of hydraulic fluid.

The hydraulic pressure control valve includes a sleeve having various kinds of ports. The hydraulic pressure control valve is equipped to the cavity such that the ports of the sleeve communicate with the ports of the body. Within the sleeve, a spool is manipulated in the axial direction to change a communication state between a supply port and an outlet port and a communication state between the outlet port and a drain port thereby to control a hydraulic pressure in the controlled object.

The sleeve of a hydraulic pressure control valve has, for example, a first port, a second port, and a third port, which are configured to communicate with the supply port, the outlet port, and the drain port, respectively. The spool includes multiple lands, which are slidable along the inner circumferential periphery of the sleeve. The spool is accommodated in the sleeve thereby to form three hydraulic chambers for hydraulic fluid. The three hydraulic chambers are partitioned by the lands. The first to third ports open in the hydraulic chambers, respectively. The spool is manipulated and moved within the sleeve in the axial direction thereby to control the communication states among the hydraulic chambers. Specifically, the spool is moved to change the communication state between the supply port and the outlet port and the communication state between the outlet port and the drain port.

It is noted that, hydraulic fluid supplied from the supply source and hydraulic fluid drawn from the controlled object flows into the hydraulic chamber in the sleeve to apply a dynamic pressure on the spool. This dynamic pressure biases the spool in a direction, which is not along the axial direction of the spool in which the spool is supposed to move. Therefore, the dynamic pressure caused by the hydraulic fluid flowing into the hydraulic chamber biases the spool in the radial direction. Thus, the dynamic pressure causes a hydraulic lateral force to bias the spool onto the inner circumferential periphery of the sleeve. The hydraulic lateral force may cause fluctuation in an operating characteristic of the hydraulic pressure control valve.

In recent years, the hydraulic pressure control valve is employed for controlling a hydraulic pressure in a presently emerged controlled object, such as a continuously variable transmission device, which requires high-pressure control compared with conventional control objects. It is expected that a quantity of flow of hydraulic fluid, which flows through the hydraulic chamber, further increases. Therefore, it is conceivable that the hydraulic lateral force further increases to exert further remarkable influence of hydraulic lateral force on the operating characteristic of a hydraulic pressure control valve. In view of these backgrounds, it may be desirable to provide a configuration to enable reduction in influence of the hydraulic lateral force exerted on the operating characteristic of a hydraulic pressure control valve.

(Patent Document 1)

Publication of Unexamined Japanese Patent Application No. H10-289018

SUMMARY

It is an object of the present disclosure to produce a hydraulic pressure control valve configured to reduce influence of a hydraulic lateral force exerted on its operating characteristic.

According to an aspect of the present disclosure, a hydraulic pressure control valve is configured to be equipped to a tubular cavity, to which a supply port and an outlet port are open. The supply port is connected to a supply source of hydraulic fluid. The outlet port is connected to a hydraulic pressure chamber of a controlled object. The hydraulic pressure control valve is configured to control a communication state between the supply port and the outlet port to supply hydraulic fluid to the controlled object and to control a hydraulic pressure in the controlled object. The hydraulic pressure control valve comprises a tubular sleeve having a first port and a second port, which communicate with the supply port and the outlet port, respectively, when the tubular sleeve is equipped to the cavity. The hydraulic pressure control valve further comprises a spool including a land, which is supported by an inner circumferential periphery of the sleeve slidably in an axial direction, to form a hydraulic chamber of hydraulic fluid with the inner circumferential periphery of the sleeve. The spool is configured to be displaced in the axial direction in the sleeve to cause the land to control a communication state between the first port and the second port through the hydraulic chamber. The hydraulic pressure control valve further comprises a supply-side hydraulic passage forming a plurality of outflow holes in the hydraulic chamber and connecting with the hydraulic chamber to conduct hydraulic fluid from the hydraulic chamber through the second port to the outlet port.

According to another aspect of the present disclosure, a hydraulic pressure control valve is configured to be equipped to a tubular cavity, to which an outlet port and a drain port are open. The outlet port is connected to a hydraulic pressure chamber of a controlled object. The drain port is connected to a drain destination of hydraulic fluid. The hydraulic pressure control valve is configured to control a communication state between the outlet port and the drain port to drain hydraulic fluid from the controlled object and to control a hydraulic pressure in the controlled object. The hydraulic pressure control valve comprises a tubular sleeve having a second port and a third port, which communicate with the outlet port and the drain port, respectively, when the tubular sleeve is equipped to the cavity. The hydraulic pressure control valve further comprises a spool including a land, which is supported by an inner circumferential periphery of the sleeve slidably in an axial direction, to form a hydraulic chamber of hydraulic fluid with the inner circumferential periphery of the sleeve. The spool is configured to be displaced in the axial direction in the sleeve to cause the land to control a communication state between the second port and the third port through the hydraulic chamber. The hydraulic pressure control valve further comprises a drain-side hydraulic passage forming a plurality of outflow holes in the hydraulic chamber and connecting with the hydraulic chamber to conduct hydraulic fluid from the hydraulic chamber through the third port to the drain port.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
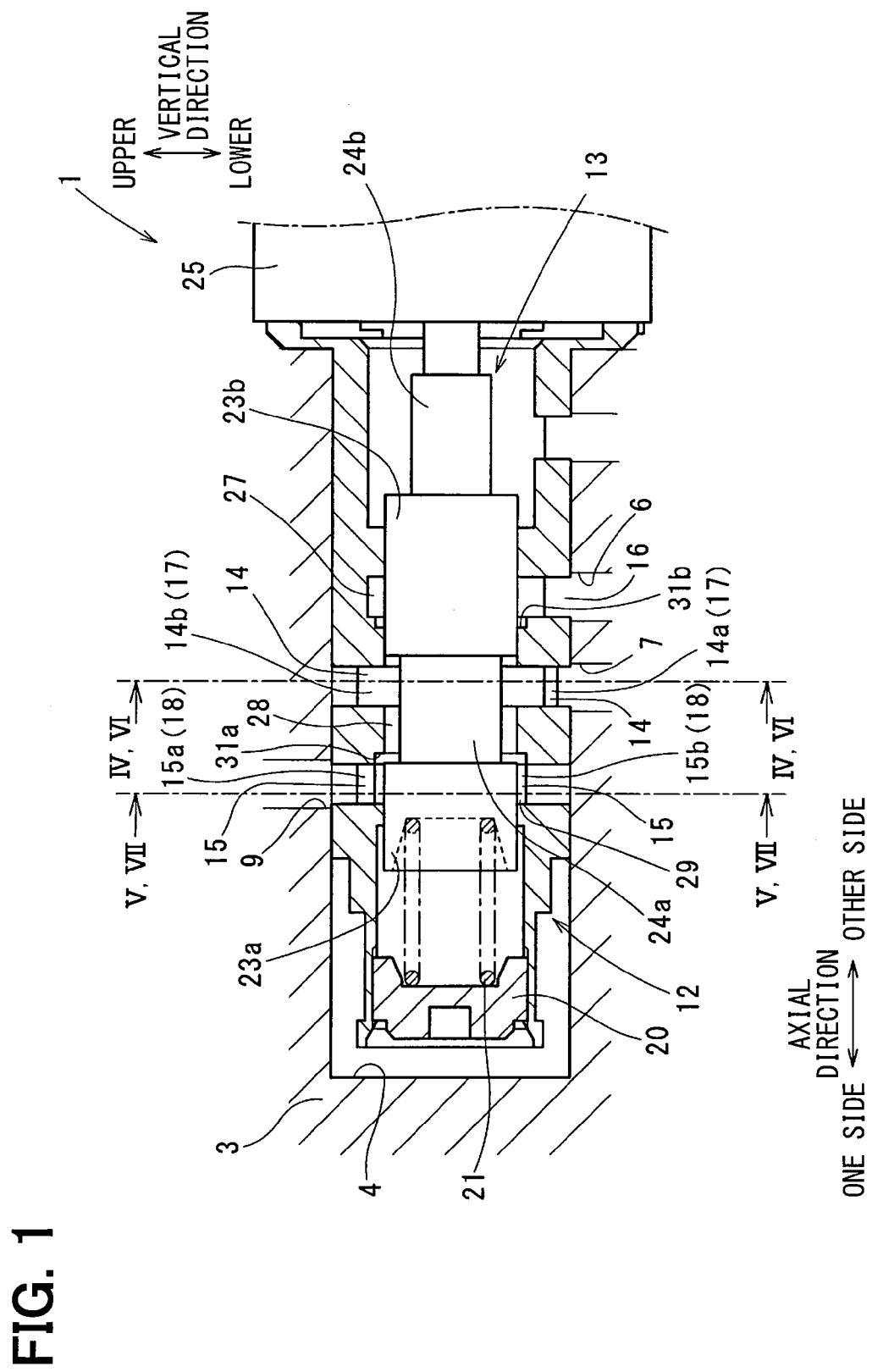
FIG. 1 is a sectional view showing a configuration of a hydraulic pressure control valve according to a first embodiment.

A hydraulic pressure control valve according to embodiments of the present disclosure will be described with reference to drawings.

(First Embodiment)
(Configuration of First Embodiment)

A configuration of a hydraulic pressure control valve 1 according to a first embodiment will be described with reference to FIGS. 1 to 8B. The hydraulic pressure control valve 1 is configured to supply hydraulic fluid to a controlled object 2 and to draw hydraulic fluid from the controlled object 2 thereby to control a hydraulic pressure in the controlled object 2. The hydraulic pressure control valve 1 is, for example, included in a body 3 of an automatic transmission device, which is equipped to a vehicle, to control hydraulic pressure to be applied to a transmission element. In this case, the transmission element is the controlled object 2, in which hydraulic pressure is controlled.

The hydraulic pressure control valve 1 is accommodated in a tubular cavity 4, which is formed in the body 3, and is assembled to the body 3. The cavity 4 communicates with a supply port 6, an outlet port 7, and a drain port 9. The supply port 6 is connected to a hydraulic pump, which is a supply source 5 of hydraulic fluid. The outlet port 7 is connected to a hydraulic pressure chamber of the controlled object 2. The drain port 9 is connected to an oil pan, which is a drain destination 8 of hydraulic fluid. The hydraulic pressure control valve 1 controls a communication state between the supply port 6 and the outlet port 7 and a communication state between the outlet port 7 and the drain port 9 thereby to control hydraulic pressure in the controlled object 2.

The supply port 6 and the outlet port 7 open on the lower side of the cavity 4 relative to an upper and lower direction (vertical direction). The drain port 9 opens on the upper side of the cavity 4 relative to the upper and lower direction. As shown in FIG. 1, one side and the other side are defined relative to the axial direction of the hydraulic pressure control valve 1 and the cavity 4. The supply port 6, the outlet port 7, and the drain port 9 are arranged in order toward the one side in the axial direction.

As follows, the configuration of the hydraulic pressure control valve 1 will be described in order of a sleeve 12, a spool 13, a supply-side hydraulic passage 14, and the drain-side hydraulic passage 15, which are primal components of the present disclosure.

The sleeve 12 is in a tubular shape and has the outer diameter, which substantially coincides with the inner diameter of the cavity 4. The sleeve 12 has a first port 16, a second port 17, and a third port 18. The first port 16, the second port 17, and the third port 18 regularly communicate with the supply port 6, the outlet port 7, and the drain port 9, respectively, in a condition where the hydraulic pressure control valve 1 is equipped in the cavity 4. The first port 16, the second port 17, and the third port 18 are arranged in order toward the one side in the axial direction.

The sleeve 12 has an inner circumferential periphery in which the spool 13 is supported in a slidable manner in the axial direction. The spool 13 is accommodated in the sleeve 12 such that one end of the spool 13 in the axial direction does not project from the inner circumferential periphery of the sleeve 12. One end of the sleeve 12 is blocked with a plug 20. A spring 21 is accommodated between the spool 13 and the plug 20, while being compressed in the axial direction.

The spool 13 includes two lands 23a and 23b and shanks 24a and 24b. The lands 23a and 23b have the same diameter. The lands 23a and 23b are supported in the inner circumferential periphery of the sleeve 12 and are slidable in the axial direction. The shanks 24a and 24b are smaller in diameter than the lands 23a and 23b. The lands 23a and 23b and the shanks 24a and 24b are coaxial with each other. The land 23a forms one end of the spool 13. The land 23a has an end surface dented toward the other side in the axial direction to form a seat supporting the spring 21. The land 23b is located on the other side of the land 23a in the axial direction across the shank 24a. The shank 24b is projected from the other end of the land 23b toward the other side in the axial direction.

The sleeve 12 and the spool 13 function as a valve portion of the hydraulic pressure control valve 1. An actuator 25 is equipped to the other side of the sleeve 12 and the spool 13 in the axial direction to produce a thrust force to actuate the spool 13 toward the one side in the axial direction. The shank 24b is projected into the actuator 25 to receive the thrust force from the actuator 25.

In the present configuration, when the actuator 25 operates to produce and a thrust force, the spool 13 receives the thrust force from the actuator 25 to move toward the one side in the axial direction, while compressing the spring 21. Alternatively, when the actuator 25 terminates its operation to stop producing of the thrust force, the spool 13 moves toward the other side in the axial direction due to resilience of the spring 21.

The actuator 25 is, for example, an electromagnetism solenoid device operable when a coil (not shown) is supplied with electricity to generate a magnetic attraction force. The actuator 25 produces the magnetic attraction force as the thrust force. The spool 13 is movable in the axial direction according to, mainly, a balance between the thrust force produced by the actuator 25 and the resilience (spring force) of the spring 21. Specifically, the spool 13 moves toward the one side in the axial direction, as the thrust force increases, and moves toward the other side in the axial direction, as the thrust force decreases.

The spool 13 forms three hydraulic chambers with the inner circumferential periphery of the sleeve 12 to flow hydraulic fluid therethrough. The three hydraulic chambers include a first hydraulic chamber 27, a second hydraulic chamber 28, and a third hydraulic chamber 29, which are arranged in this order toward the one side in the axial direction. The first hydraulic chamber 27 communicates with the first port 16. The first hydraulic chamber 27 is formed mainly between the inner circumferential periphery of the sleeve 12 and the outer circumferential periphery of the land 23b. The second hydraulic chamber 28 communicates with the second port 17. The second hydraulic chamber 28 is formed mainly between the inner circumferential periphery of the sleeve 12 and the outer circumferential periphery of the shank 24a.

The second hydraulic chamber 28 is partitioned at the one side in the axial direction by the end surface of the land 23a on the other side. The second hydraulic chamber 28 is partitioned at the other side in the axial direction by the end surface of the land 23b on the one side. The second hydraulic chamber 28 moves in the axial direction according to movement of the spool 13. The third hydraulic chamber 29 communicates with the third port 18. The third hydraulic chamber 29 is formed mainly between the inner circumferential periphery of the sleeve 12 and the outer circumferential periphery of the land 23a.

Figure 2A:
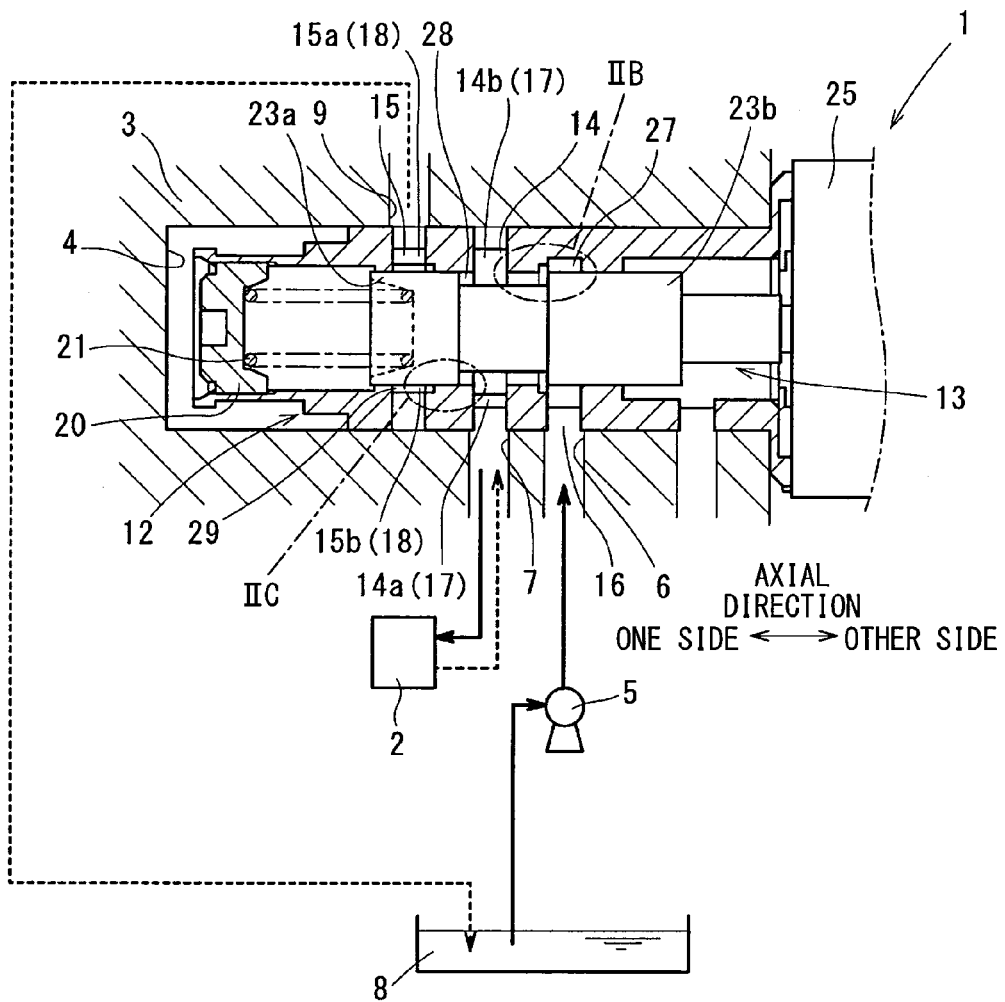
FIG. 2A is a sectional view showing the hydraulic pressure control valve according to the first embodiment, when a communication state on a supply side is open, and a communication state on a drain side is close.
Figure 2B:
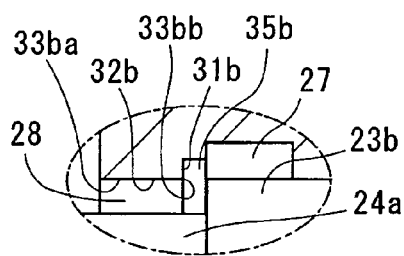
FIG. 2B is an enlarged view corresponding to the area IIB in FIG. 2A.
Figure 2C:
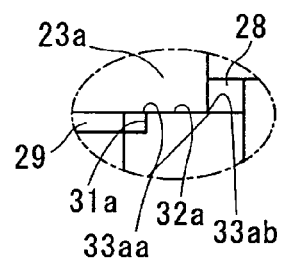
FIG. 2C is an enlarged view corresponding to the area IIC in FIG. 2A.

The first hydraulic chamber 27 communicates with the second hydraulic chamber 28 in a condition shown in FIGS. 2A to 2C where the thrust force caused by the actuator 25 is low to move the spool 13 and the second hydraulic chamber 28 toward the other side in the axial direction. The second hydraulic chamber 28 communicates with the third hydraulic chamber 29 in a condition shown in FIGS. 3A to 3C where the thrust force caused by the actuator 25 is high to move the spool 13 and the second hydraulic chamber 28 toward the one side in the axial direction.

The spool 13 is movable within the sleeve 12 in the axial direction to manipulate the land 23b thereby to control a communication state on the supply side between the first port 16 and the second port 17 through the first and second hydraulic chambers 27 and 28. Similarly, the spool 13 is movable within the sleeve 12 in the axial direction to manipulate the land 23a thereby to control a communication state on the drain side between the second port 17 and the third port 18 through the second and third hydraulic chambers 28 and 29.

In the present configuration, as shown in FIGS. 2A to 2C, the thrust force of the actuator 25 is decreased to move the spool 13 and the second hydraulic chamber 28 toward the other side in the axial direction by application of the spring force thereby to supply hydraulic fluid from the supply source 5 into the controlled object 2. In this way, the communication state on the supply side is set to open, and the communication state on the drain side is set to close. As a result, hydraulic fluid supplied from the supply source 5 flows through the supply port 6, the first port 16, the first and second hydraulic chambers 27 and 28, the second port 17, and the outlet port 7 in order. Thus, the hydraulic fluid is supplied into the controlled object 2. The hydraulic fluid is supplied from the supply source 5 into the controlled object 2 by a flow quantity on the supply side.

Figure 3A:
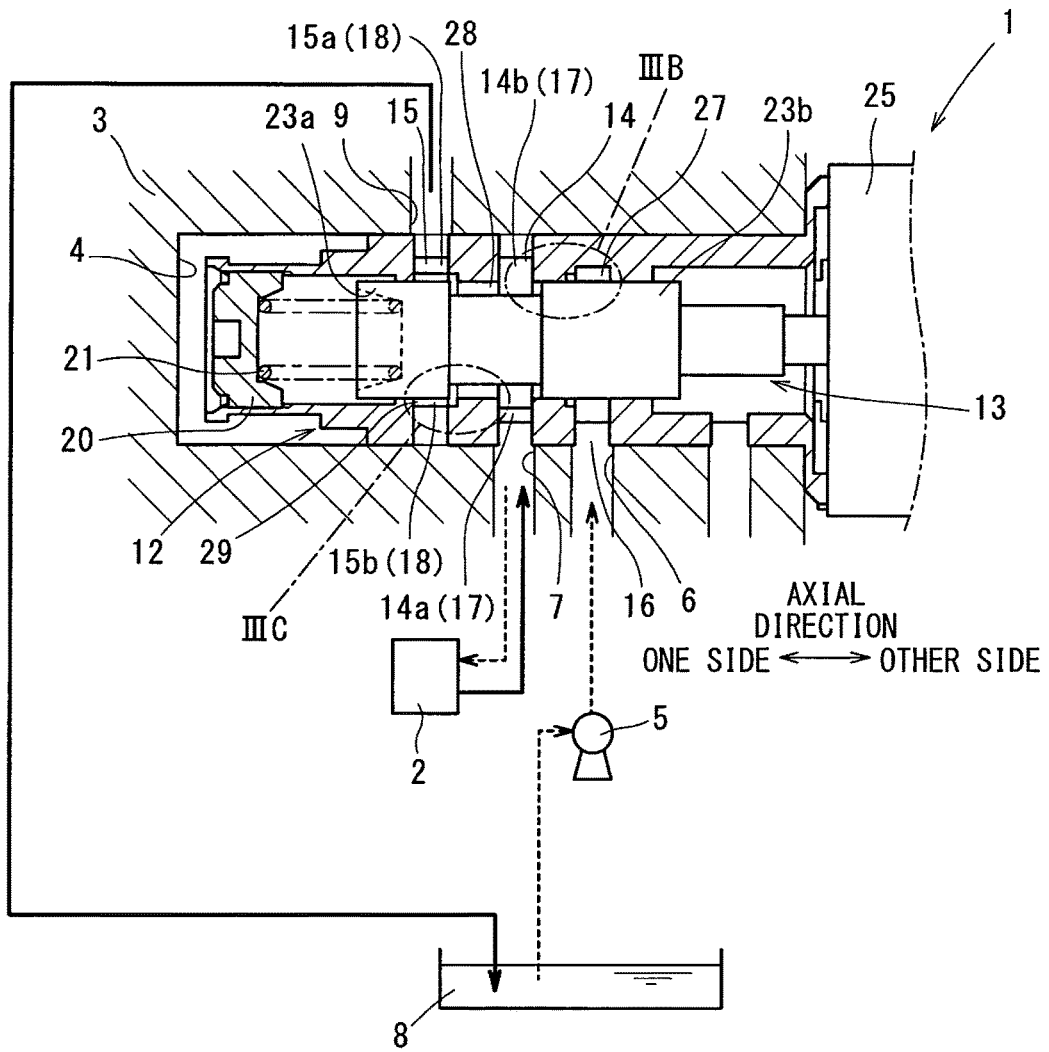
FIG. 3A is a sectional view showing the hydraulic pressure control valve according to the first embodiment, when the communication state on the drain side is open, and the communication state on the supply side is close.
Figure 3B:
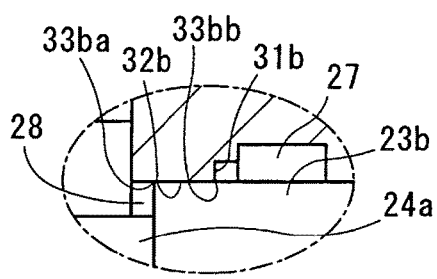
FIG. 3B is an enlarged view corresponding to the area 111B in FIG. 3A.
Figure 3C:
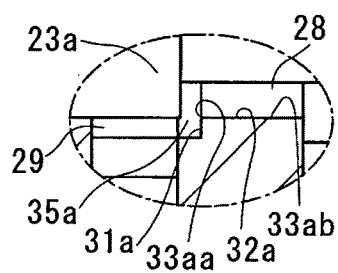
FIG. 3C is an enlarged view corresponding to the area 111C in FIG. 3A.

Alternatively, as shown in FIGS. 3A to 3C, the thrust force of the actuator 25 is increased to move the spool 13 and the second hydraulic chamber 28 toward the one side in the axial direction thereby to drain hydraulic fluid from the controlled object 2 into the drain destination 8. In this way, the communication state on the drain side is set to open, and the communication state on the supply side is set to close. As a result, hydraulic fluid drained from the controlled object 2 flows through the outlet port 7, the second port 17, the second and third hydraulic chambers 28 and 29, the third port 18, and the drain port 9 in order. Thus, the hydraulic fluid is drained into the drain destination 8. The hydraulic fluid is drained from the controlled object 2 into the drain destination 8 by a flow quantity on the drain side.

The inner circumferential periphery of the sleeve 12 defines a step portion 31a at the end of the third port 18 on the other side in the axial direction. The step portion 31a is in an annular shape and surrounds the entire circumferential periphery of the land 23a. The step portion 31a is dented toward the other side in the axial direction to form a step in the radial direction. The inner circumferential periphery of the step portion 31a has a seat region 32a on the other side in the axial direction. When the communication state on the drain side is closed, the land 23a is slidably in contact with the seat region 32a. Alternatively, when the communication state on the drain side is open, the land 23a is not slidably in contact with the seat region 32a. As shown in FIGS. 2A to 3C, the seat region 32a is defined by a boundary 33aa on the one side in the axial direction and a boundary 33ab on the other side in the axial direction.

As shown in FIGS. 3A to 3C, when the land 23a moves away from the boundary 33aa toward the one side in the axial direction, the communication state on the drain side is changed from close to open. When the communication state on the drain side is open, hydraulic fluid flows from the boundary 33ab toward the boundary 33aa. In the present state, the step portion 31a forms a throttle 35a on the drain side with the land 23a. The throttle 35a on the drain side throttles flow from the second hydraulic chamber 28 into the third hydraulic chamber 29.

When the communication state on the drain side is open, the distance between the boundary 33aa and the end of the land 23a on the other side in the axial direction increases, according to increase in the thrust force of the actuator 25. In this way, an effective passage area of the throttle 35a on the drain side becomes large, thereby to increase the quantity of flow on the drain side. The present state corresponds to a control range of the quantity of flow on the drain side in FIG. 8A. When the distance between the other end of the land 23a in the axial direction and the boundary 33aa becomes greater than a predetermined threshold, the gap between the step portion 31a and the land 23a does not function as a throttle. In the present state, the quantity of flow on the drain side does not increase greater than a maximum value Qmax.

In the above-described configuration, the spool 13 causes the land 23a to shift the communication state on the drain side between open and close. Furthermore, the spool 13 causes the land 23a to increase and decrease the quantity of flow on the drain side when the communication state on the drain side is open.

The inner circumferential periphery of the sleeve 12 defines a step portion 31b at the end of the first port 16 on the one side in the axial direction. The step portion 31b is in an annular shape and surrounds the entire circumferential periphery of the land 23b. The step portion 31b is dented toward the one side in the axial direction to form a step in the radial direction. The inner circumferential periphery of the step portion 31b has a seat region 32b on the one side in the axial direction. When the communication state on the supply side is close, the land 23b is slidably in contact with the seat region 32b. Alternatively, when the communication state on the supply side is open, the land 23b is not slidably in contact with the seat region 32b. The seat region 32b is defined by a boundary 33ba on the one side in the axial direction and a boundary 33bb on the other side in the axial direction.

As shown in FIGS. 2A to 2C, when the land 23b moves away from the boundary 33bb toward the other side in the axial direction, the communication state on the supply side is changed from close to open. When the communication state on the supply side is open, hydraulic fluid flows from the boundary 33bb toward the boundary 33ba. In the present state, the step portion 31b forms a throttle 35b on the supply side with the land 23b. The throttle 35b on the supply side throttles flow from the first hydraulic chamber 27 into the second hydraulic chamber 28.

When the communication state on the supply side is open, the distance between the boundary 33bb and the end of the land 23b on the one side in the axial direction increases, according to decrease in the thrust force of the actuator 25. In this way, an effective passage area of the throttle 35b on the supply side becomes large, thereby to increase the quantity of flow on the supply side. The present state corresponds to a control range of the quantity of flow on the supply side in FIG. 8A. When the distance between the one end of the land 23b in the axial direction and the boundary 33bb becomes greater than a predetermined threshold, the gap between the step portion 31b and the land 23b does not function as a throttle. In the present state, the quantity of flow on the supply side does not increase greater than a maximum value Qmax.

In the above-described configuration, the spool 13 causes the land 23b to shift the communication state on the supply side between open and close. Furthermore, the spool 13 causes the land 23b to increase and decrease the quantity of flow on the supply side when the communication state on the supply side is open.

The supply-side hydraulic passage 14 conducts hydraulic fluid from the second hydraulic chamber 28 through the second port 17 into the outlet port 7. The supply-side hydraulic passage 14 has two outflow holes 14a and 14b communicating with the second hydraulic chamber 28. Hydraulic fluid flows out of the outflow holes 14a and 14b to be conducted into the outlet port 7 without returning into the sleeve 12 again. The outflow holes 14a and 14b function as the second port 17.

Figure 4:
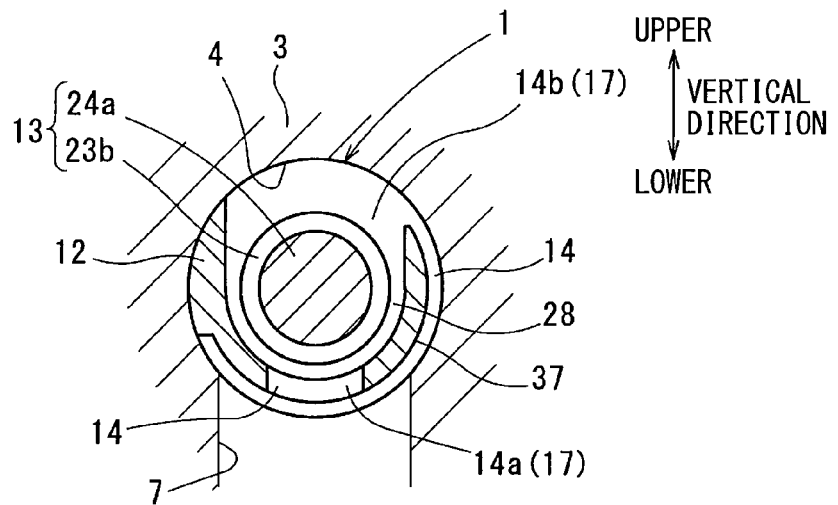
FIG. 4 is a sectional view taken along the line IV-IV in FIG. 1 and showing the hydraulic pressure control valve according to the first embodiment.

As shown in FIG. 4, the supply-side hydraulic passage 14 is formed by, for example, forming an annular groove 37 in the outer circumferential periphery of the sleeve 12 at a position overlapping with a full-open range of the outlet port 7. In the present configuration, the outflow holes 14a and 14b are further perforated to communicate the groove 37 with the second hydraulic chamber 28.

The outflow hole 14a is directed substantially in the same direction as the direction of the outlet port 7. The outflow hole 14a is located substantially at the same position as the position of the outlet port 7 in the axial direction. The outflow hole 14b is directed in a direction shifted by substantially 180 degrees relative to the direction of the outlet port 7. The outflow hole 14a is located substantially at the same position as the position of the outlet port 7 in the axial direction. In short, the outflow hole 14a opens downward, and the outflow hole 14b opens upward. The outflow holes 14a and 14b are located substantially at the same position relative to the axial direction.

In the present configuration of the supply-side hydraulic passage 14, hydraulic fluid flows out through the outflow hole 14a and further flows linearly into the outlet port 7 downward. In addition, hydraulic fluid flows out through the outflow hole 14b and further flows annularly through the groove 37, and then flows into the outlet port 7 downward. The outflow hole 14b has an opening area relative to the groove 37 and the opening area of the outflow hole 14b is substantially the same as an opening area of the outlet port 7. The outflow hole 14a has an opening area relative to the groove 37, and the opening area of the outflow hole 14a is in a range between ⅓ and ⅔ of the opening area of the outflow hole 14b relative to the groove 37.

The drain-side hydraulic passage 15 conducts hydraulic fluid from the third hydraulic chamber 29 through the third port 18 into the drain port 9. The drain-side hydraulic passage 15 has two outflow holes 15a and 15b communicating with the third hydraulic chamber 29. Hydraulic fluid flows out of the outflow holes 15a and 15b to be conducted into the drain port 9 without returning into the sleeve 12 again. The outflow holes 15a and 15b function as the third port 18.

Figure 5:
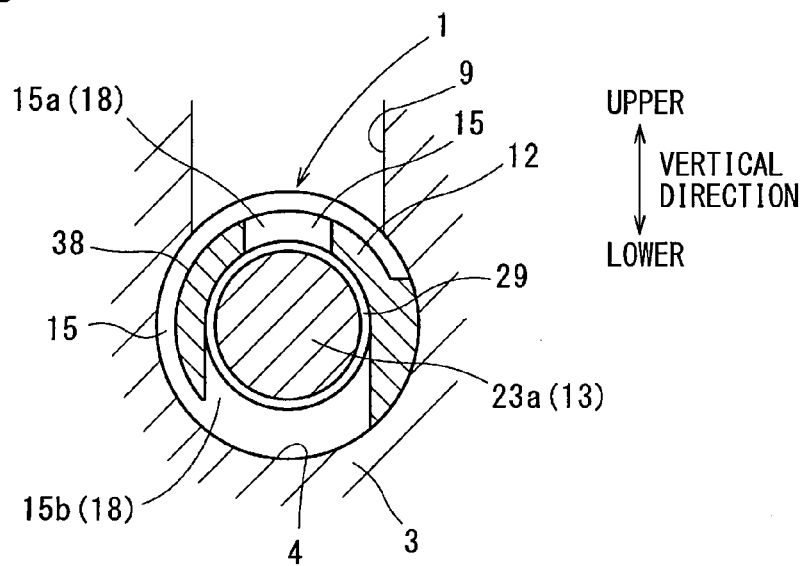
FIG. 5 is a sectional view taken along the line V-V in FIG. 1 and showing the hydraulic pressure control valve according to the first embodiment.

As shown in FIG. 5, the drain-side hydraulic passage 15 is formed by, for example, forming an annular groove 38 in the outer circumferential periphery of the sleeve 12 at a position overlapping with a full-open range of the drain port 9. In the present configuration, the outflow holes 15a and 15b are further perforated to communicate the groove 38 with the third hydraulic chamber 29.

The outflow hole 15a is directed substantially in the same direction as the direction of the drain port 9. The outflow hole 15a is located substantially at the same position as the position of the drain port 9 in the axial direction. The outflow hole 15b is directed in a direction shifted by substantially 180 degrees relative to the direction of the drain port 9. The outflow hole 15b is located substantially at the same position as the position of the drain port 9 in the axial direction. In short, the outflow hole 15a opens upward, and the outflow hole 15b opens downward. The outflow holes 15a and 15b are located substantially at the same position relative to the axial direction.

In the present configuration of the drain-side hydraulic passage 15, hydraulic fluid flows out through the outflow hole 15a and further flows linearly into the drain port 9 upward. In addition, hydraulic fluid flows out through the outflow hole 15b and further flows annularly through the groove 38, and then flows into the drain port 9 upward. The outflow hole 15b has an opening area relative to the groove 38, and the opening area of the outflow hole 15b is substantially the same as an opening area of the drain port 9. The outflow hole 15a has an opening area relative to the groove 38, and the opening area of the outflow hole 15a is in a range between ⅓ and ⅔ of the opening area of the outflow hole 15b relative to the groove 38.

(Operating Characteristic of First Embodiment)

Figure 6:
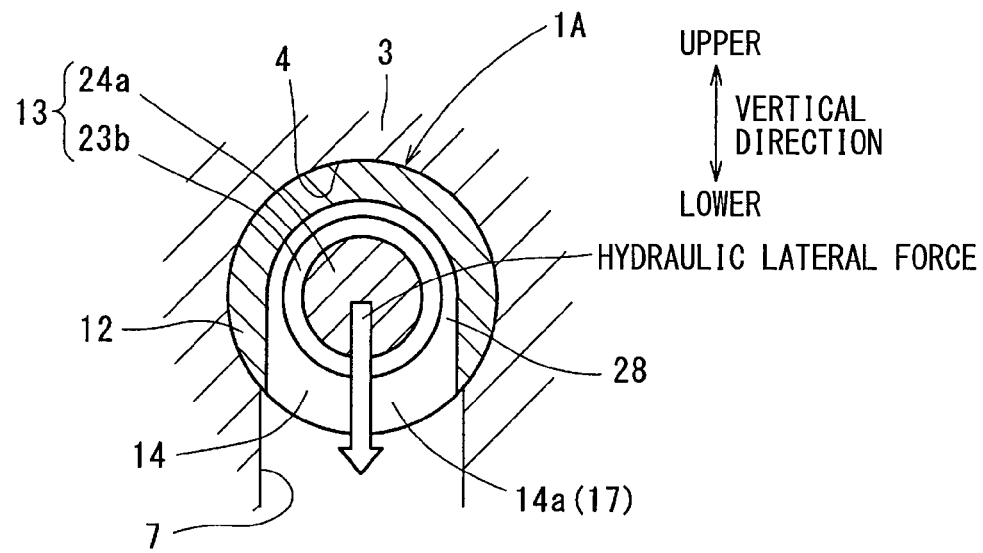
FIG. 6 is a sectional view taken along the line VI-VI in FIG. 1 and showing a hydraulic pressure control valve according to a comparative example.
Figure 7:
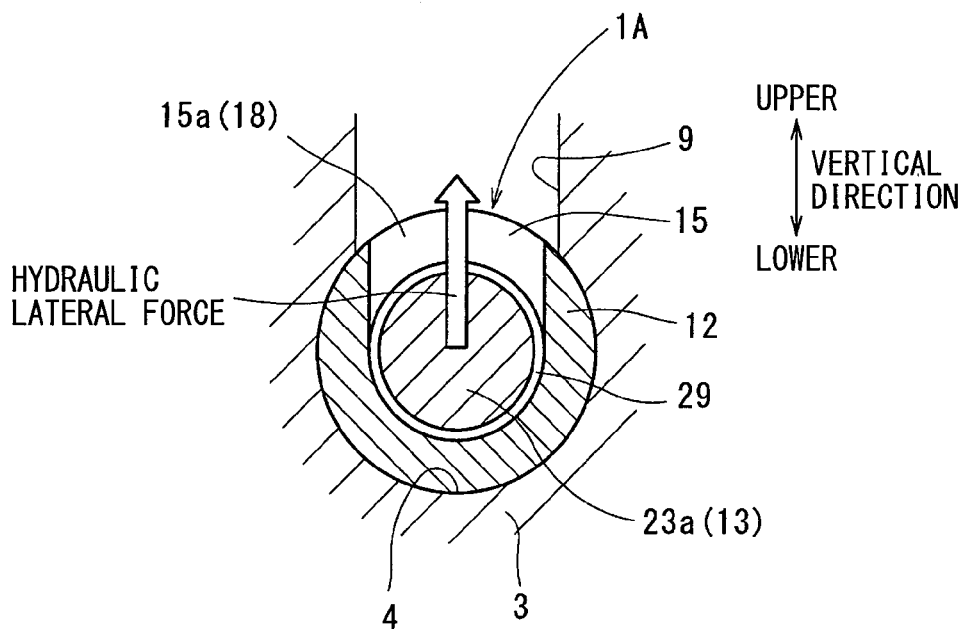
FIG. 7 is a sectional view taken along the line VII-VII in FIG. 1 and showing the hydraulic pressure control valve according to the comparative example.

As follows, an operating characteristic of the hydraulic pressure control valve 1 according to the first embodiment will be described in comparison with an operating characteristic of a hydraulic pressure control valve 1A according to a comparative example shown in FIGS. 6 and 7. FIGS. 6 and 7 show the hydraulic pressure control valve 1A according to the comparative example. The hydraulic pressure control valve 1A has a supply-side hydraulic passage 14, which has only one outflow hole 14a communicating with the second hydraulic chamber 28, and has a drain-side hydraulic passage 15, which has only one outflow hole 15a communicating with the third hydraulic chamber 29.

That is, in the hydraulic pressure control valve 1A, the outflow holes 14b and 15b do not exist. In addition, the outflow holes 14a and 15a are directed substantially in the same directions of the outlet port 7 and the drain port 9, respectively. Furthermore, the opening areas of the outflow holes 14a and 15a are substantially the same as the opening areas of the outlet port 7 and the drain port 9, respectively. Furthermore, the outflow holes 14a and 15a function as the second and third ports 17 and 18, respectively.

Figures 8A, 8B:
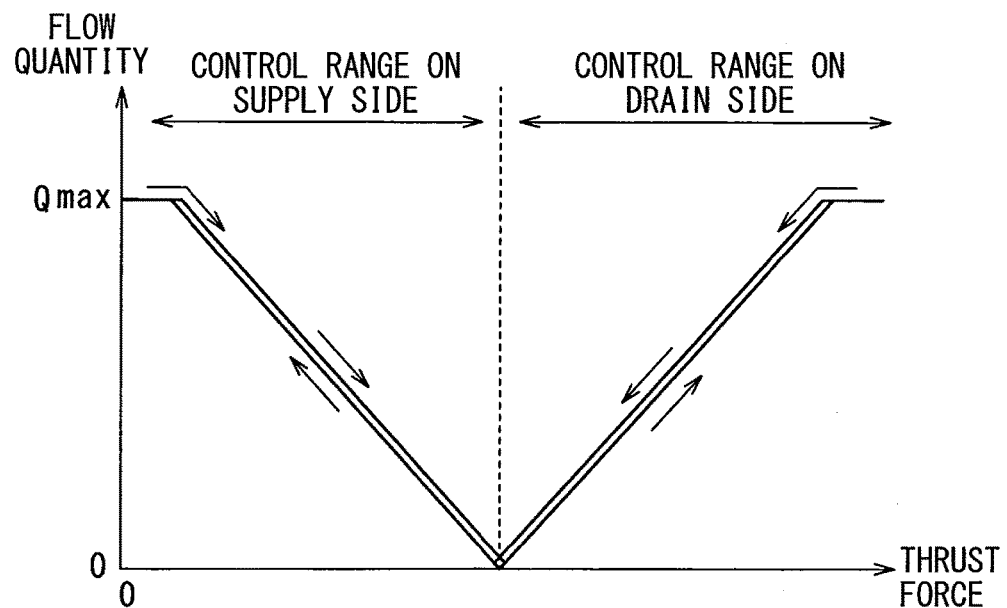
FIG. 8A is a graph showing an operating characteristic of the hydraulic pressure control valve according to the first embodiment.
FIG. 8B is a graph showing an operating characteristic of the hydraulic pressure control valve according to the comparative example.
Figure 9:
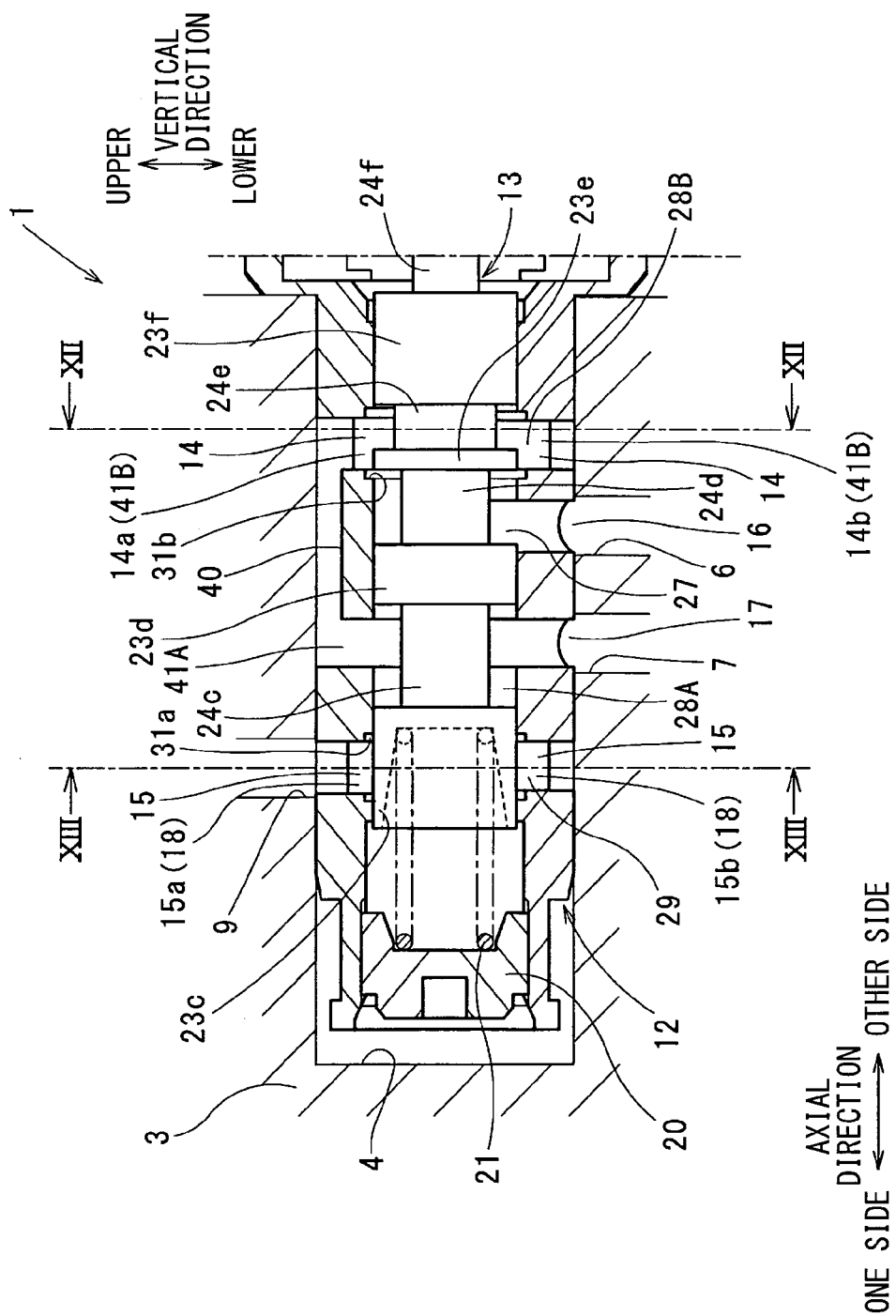
FIG. 9 is a sectional view showing a configuration of a hydraulic pressure control valve according to a second embodiment.

As follows, with reference to FIGS. 8A and 8B, comparison of the operating characteristics between the hydraulic pressure control valves 1 and 1A will be described by focusing on, for example, a correlation between the thrust force generated by the actuator 25 and the quantity of flow on the supply side and the drain side.

As described above, in the hydraulic pressure control valve 1A, the supply-side hydraulic passage 14 has the only one outflow hole 14a, and the drain-side hydraulic passage 15 has the only one outflow hole 15a. As shown in FIG. 8B, in the configuration of the hydraulic pressure control valve 1A according to the comparative example, the operating characteristic shows a sticking tendency to drop the quantity of flow stepwise relative to change in the thrust force when the quantity of flow decreases from the maximum value Qmax. The sticking tendency is observed in each of the supply side and the drain side.

As follows, an exemplified operation will be described. In an initial state, the thrust force is zero, and the flow quantity on the supply side is at the maximum value Qmax. In the initial state, the thrust force is increased in order to decrease the flow quantity on the supply side from the maximum value Qmax. In this case, the spool 13 receives forces, which are represented by the Equation 1, in the axial direction, until the spool 13 starts movement in the axial direction from the position in the initial state.

$$\text{thrust force} \leq \text{spring force} + \text{static friction force} \quad \text{(Equation 1)}$$

Herein, the static friction force is a value calculated by multiplying a hydraulic lateral force by a static friction coefficient. In the configuration shown in FIG. 6, hydraulic fluid flows into the second hydraulic chamber 28 and further flows out to the supply-side hydraulic passage 14 after passing through the only one outflow hole 14a. In the configuration of FIG. 6, the hydraulic lateral force in the second hydraulic chamber 28 concentrates downward to work on the spool 13. Consequently, the static friction force significantly increases in the present configuration. Therefore, the spool 13 may become unmovable in the axial direction from the position in the initial state, without considerable increase in the thrust force. Thereafter, when the thrust force increases to be slightly greater than a sum of the spring force and the static friction force, the spool 13 abruptly starts moving in the axial direction toward the one side. Consequently, the quantity of flow abruptly decreases. For the above-described reasons, the sticking tendency occurs in the correlation between the thrust force and the flow quantity on the supply side.

As follows, another exemplified operation will be described. In an initial state, the thrust force is sufficiently large, and the flow quantity on the drain side is at the maximum value Qmax. In the present initial state, the thrust force is decreased to move the spool 13 by application of the spring force in order to decrease the flow quantity on the drain side from the maximum value Qmax. The spool 13 receives forces, which are represented by the Equation 2, in the axial direction, in a condition where the thrust force is large, and the spool 13 is unmovable in the axial direction from the position in the initial state.

$$\text{spring force} \leq \text{thrust force} + \text{static friction force} \quad \text{(Equation 2)}$$

In the configuration shown in FIG. 7, hydraulic fluid flows into the third hydraulic chamber 29 and further flows out to the drain-side hydraulic passage 15 after passing through the only one outflow hole 15a. In the configuration of FIG. 7, the hydraulic lateral force in the third hydraulic chamber 29 concentrates upward to work on the spool 13. Consequently, the static friction force significantly increases in the present configuration. Therefore, the spool 13 may become unmovable in the axial direction from the position in the initial state, without considerable decrease in the thrust force. Thereafter, when the sum of the thrust force and the static friction force becomes slightly less than the spring force, the spool 13 abruptly starts moving in the axial direction toward the other side. Consequently, the quantity of flow abruptly decreases. For the above-described reasons, the sticking tendency also occurs in the correlation between the thrust force and the flow quantity on the drain side.

The spool 13 receives forces, which are represented by the Equation 3, in the axial direction, in a condition where the communication state on the supply side or on the drain side is open and where the thrust force is increased to move the spool 13 in the axial direction toward the one side.

$$\text{thrust force} = \text{spring force} + \text{kinetic friction force} \quad \text{(Equation 3)}$$

Alternatively, the spool 13 receives forces, which are represented by the Equation 4, in the axial direction, in a condition where the thrust force is decreased to move the spool 13 by application of the spring force in the axial direction toward the other side.

$$\text{spring force} = \text{thrust force} + \text{kinetic friction force} \quad \text{(Equation 4)}$$

Therefore, in order to move the spool 13 in the axial direction toward the one side, the thrust force is needed to coincide substantially with (the spring force+the kinetic friction force), in compliance with the Equation 3. Alternatively, in order to move the spool 13 in the axial direction toward the other side, the thrust force is needed to coincide substantially with (the spring force−the kinetic friction force), in compliance with the Equation 4.

As a result, even in a case where the quantity of flow is changed within the same flow quantity range, the thrust force needed for increasing the quantity of flow differs from the thrust force needed for decreasing the quantity of flow. Therefore, a hysteresis occurs in each of the correlation between the thrust force and the flow quantity on the supply side and the correlation between the thrust force and the quantity of flow on the drain side. The kinetic friction force is a value calculated by multiplying the hydraulic lateral force by a coefficient of kinetic friction. Therefore, as the hydraulic lateral force increases, the difference between the thrust force, which is for moving the spool 13 in the axial direction toward the one side, and the thrust force, which is for moving the spool 13 in the axial direction toward the other side, increases. Thus, as the hydraulic lateral force increases, the hysteresis becomes greater.

To the contrary, in the hydraulic pressure control valve 1 according to the embodiment, hydraulic fluid flows into the second hydraulic chamber 28 and further flows out to the supply-side hydraulic passage 14, after being distributed into the two outflow holes 14a and 14b in the two upper and lower directions. The opening areas and the opening directions of the outflow holes 14a and 14b, a flow resistance caused in the supply-side hydraulic passage 14, and/or the like are determined, such that the hydraulic lateral forces working on the spool 13 negate each other in the radial direction thereby to become substantially zero, when the communication state on the supply side is open.

Similarly, hydraulic fluid flows into the third hydraulic chamber 29 and further flows out to the drain-side hydraulic passage 15, after being distributed into the two outflow holes 15a and 15b in the two upper and lower directions. The opening areas and the opening directions of the outflow holes 15a and 15b, a flow resistance caused in the drain-side hydraulic passage 15, and/or the like are determined, such that the hydraulic lateral forces working on the spool 13 negate each other in the radial direction thereby to become substantially zero, when the communication state on the drain side is open.

In the present configuration, the static friction force can be decreased to a small amount, thereby not to cause the sticking tendency when the quantity of flow on the supply side or the quantity of flow on the drain side is decreased from the maximum value Qmax. In addition, the kinetic friction force can be also decreased significantly. Therefore, as shown in FIG. 8A, hysteresis can be decreased significantly in each of the correlation between the thrust force and the flow quantity on the supply side and the correlation between the thrust force and the quantity of flow on the drain side.

(Effect of First Embodiment)

In the hydraulic pressure control valve 1 according to the first embodiment, the supply-side hydraulic passage 14 has the two outflow holes 14a and 14b formed in the second hydraulic chamber 28. In addition, hydraulic fluid flows into the second hydraulic chamber 28 and further flows out to the supply-side hydraulic passage 14, after being distributed into the outflow holes 14a and 14b in the upper and lower directions. In addition, the opening areas and the opening directions of the outflow holes 14a and 14b, a flow resistance caused in the supply-side hydraulic passage 14, and/or the like are determined, such that the hydraulic lateral forces working on the spool 13 negate each other in the radial direction thereby to become substantially zero, when the communication state on the supply side is open.

Similarly, the drain-side hydraulic passage 15 has the two outflow holes 15a and 15b formed in the third hydraulic chamber 29. In addition, hydraulic fluid flows into the third hydraulic chamber 29 and further flows out to the drain-side hydraulic passage 15, after being distributed into the outflow holes 15a and 15b in the upper and lower directions. The opening areas and the opening directions of the outflow holes 15a and 15b, a flow resistance caused in the drain-side hydraulic passage 15, and/or the like are determined, such that the hydraulic lateral forces working on the spool 13 negate each other in the radial direction thereby to become substantially zero, when the communication state on the drain side is open.

In the present configuration, the static friction force can be decreased to a small amount, thereby not to cause the sticking tendency when the quantity of flow on the supply side or the quantity of flow on the drain side is decreased from the maximum value Qmax. In addition, the kinetic friction force can be also decreased significantly. Therefore, hysteresis can be decreased significantly in each of the correlation between the thrust force and the flow quantity on the supply side and the correlation between the thrust force and the quantity of flow on the drain side.

In addition, the outflow holes 14a and 14b function as the second port 17, and the outflow holes 15a and 15b function as the third port 18.

In the present configuration, the outflow holes 14a and 14b for relieving the hydraulic lateral force need not be formed separately from the second port 17. In addition, the outflow holes 15a and 15b need not be formed separately from the third port 18. Therefore, the configuration and a manufacturing process can be restricted from being excessively complicated.

Furthermore, in the present configuration, when the communication state on the supply side is open, hydraulic fluid flows from the boundary 33bb toward the boundary 33ba. The present configuration enables to shorten the hydraulic passage, which extends from the first port 16 toward the second port 17, significantly, when the communication state on the supply side is open. In the present configuration, pressure loss of hydraulic fluid can be reduced.

(Second Embodiment)

As shown in FIGS. 9 to 11C, a hydraulic pressure control valve 1 according to a second embodiment has two second hydraulic chambers 28A and 28B. The two second hydraulic chambers 28A and 28B of the second embodiment are formed by diving the second hydraulic chamber 28 of the first embodiment into two chambers. The second hydraulic chamber 28A is located on the one side in the axial direction relative to the first hydraulic chamber 27. The second hydraulic chamber 28B is located on the other side in the axial direction relative to the first hydraulic chamber 27. A groove 40 extends on the upper surface of the sleeve 12 in the axial direction. The second hydraulic chambers 28A and 28B regularly communicate with each other through the groove 40. That is, the second hydraulic chambers 28A and 28B open to the groove 40 upward through intermediate ports 41A and 41B, respectively. The second hydraulic chambers 28A and 28B regularly communicate with each other through the groove 40 and the intermediate ports 41A and 41B. The second port 17 opens to the second hydraulic chamber 28A.

The spool 13 includes four lands 23c, 23d, 23e, 23f, which are arranged in this order toward the other side in the axial direction. A shank 24c is formed between the lands 23c and 23d. A shank 24d is formed between the lands 23d and 23e. A shank 24e is formed between the lands 23e and 23f. A shank 24f protrudes from an end of the land 23f on the other side toward the other side in the axial direction.

The first hydraulic chamber 27 is formed mainly between the inner circumferential periphery of the sleeve 12 and the outer circumferential periphery of the shank 24d. The first hydraulic chamber 27 is partitioned on the one side in the axial direction by an end surface of the land 23d on the other side. The first hydraulic chamber 27 is further partitioned on the other side in the axial direction by an end surface of the land 23e on the one side. The first hydraulic chamber 27 moves in the axial direction according to movement of the spool 13. The second hydraulic chamber 28A is formed mainly between the inner circumferential periphery of the sleeve 12 and the outer circumferential periphery of the shank 24c. The second hydraulic chamber 28A is partitioned on the one side in the axial direction by an end surface of the land 23c on the other side. The second hydraulic chamber 28A is further partitioned on the other side in the axial direction by an end surface of the land 23d on the one side. The second hydraulic chamber 28A moves in the axial direction according to movement of the spool 13.

The second hydraulic chamber 28B is formed mainly between the inner circumferential periphery of the sleeve 12 and the outer circumferential periphery of the shank 24e. The second hydraulic chamber 28B is partitioned on the one side in the axial direction by an end surface of the land 23e on the other side. The second hydraulic chamber 28B is further partitioned on the other side in the axial direction by an end surface of the land 23f on the one side. The second hydraulic chamber 28B moves in the axial direction according to movement of the spool 13. The third hydraulic chamber 29 is formed mainly between the inner circumferential periphery of the sleeve 12 and the outer circumferential periphery of the land 23c.

Figure 10A:
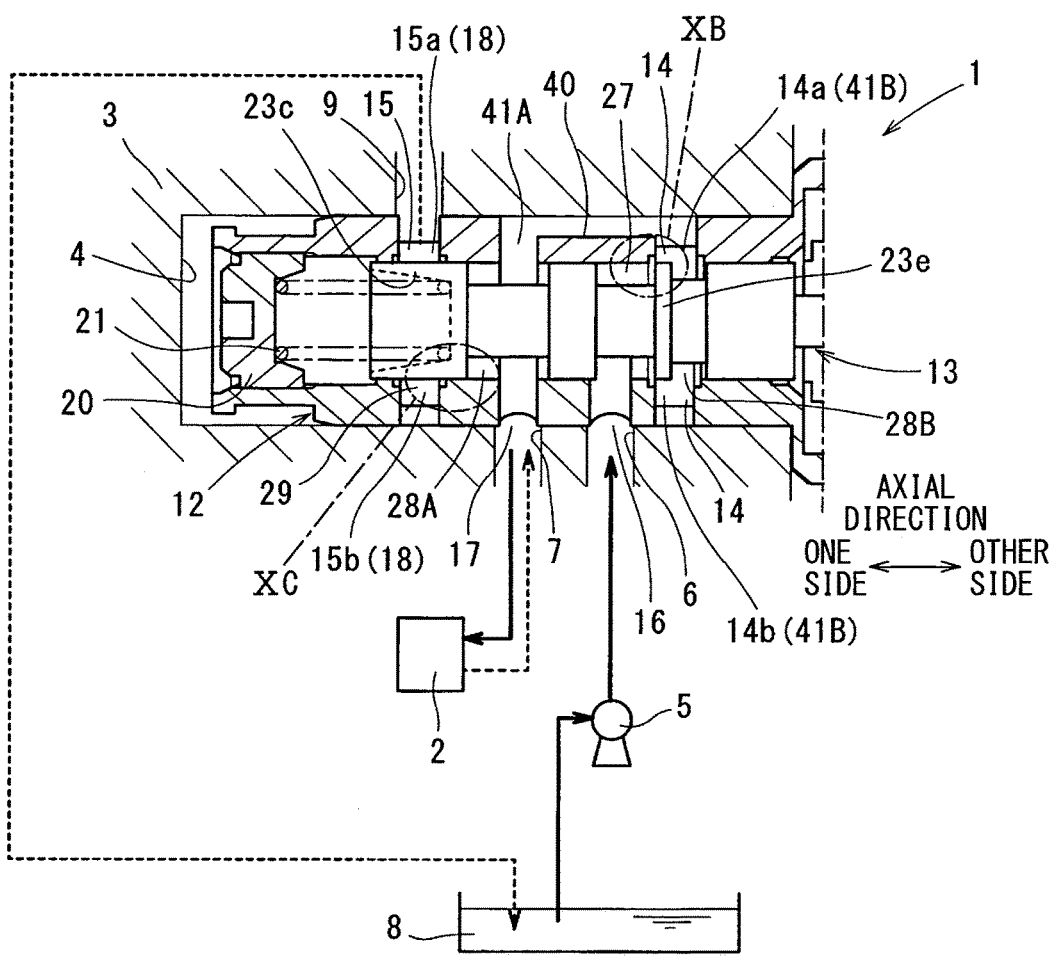
FIG. 10A is a sectional view showing the hydraulic pressure control valve according to the second embodiment, when a communication state on a supply side is open, and a communication state on a drain side is close.
Figure 10B:
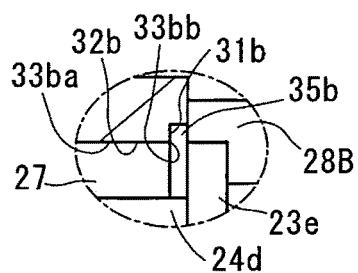
FIG. 10B is an enlarged view corresponding to the area XB in FIG. 10A.
Figure 10C:
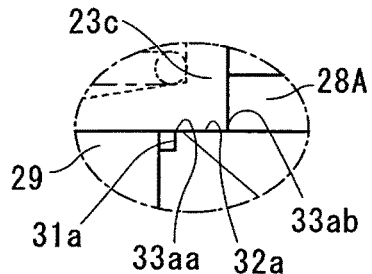
FIG. 10O is an enlarged view corresponding to the area XC in FIG. 10A.
Figure 11A:
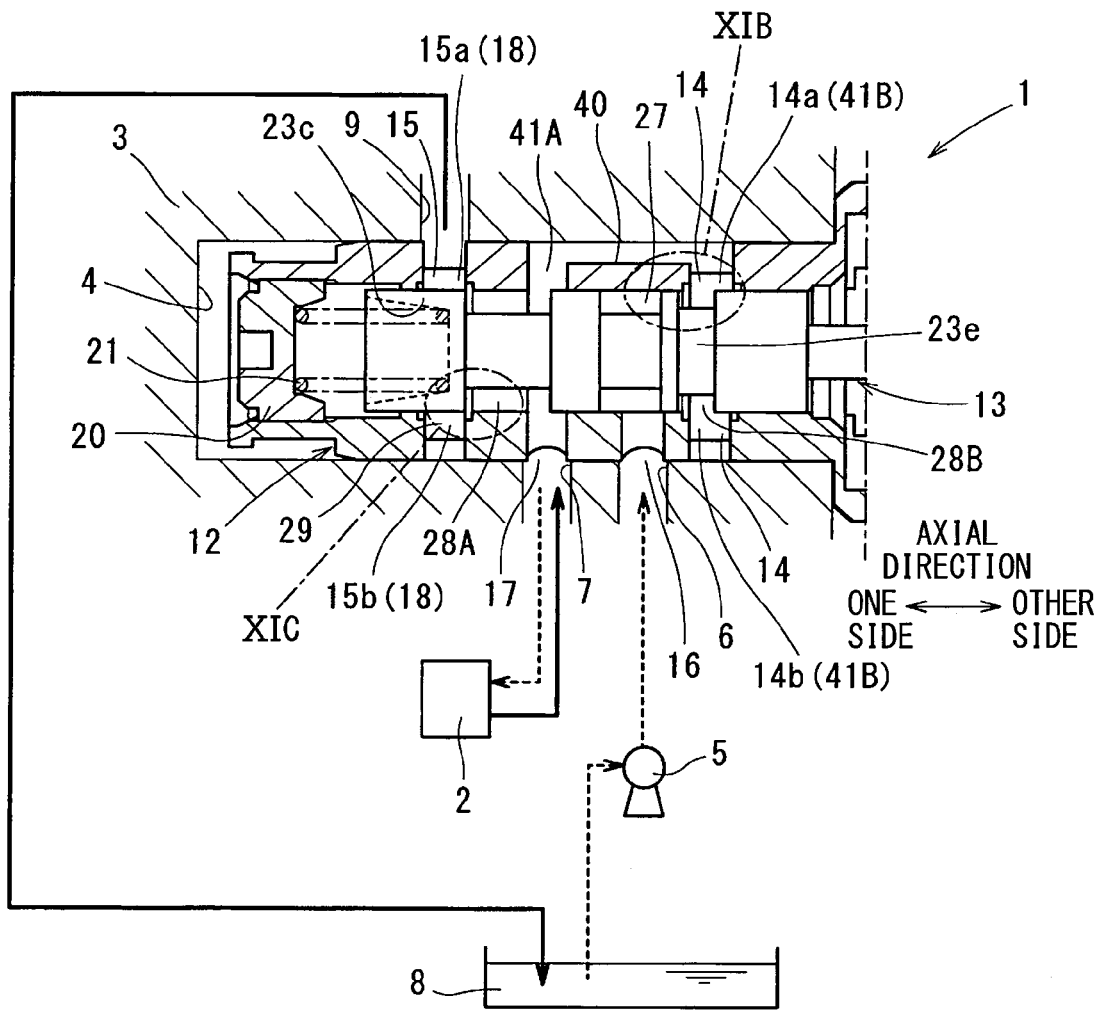
FIG. 11A is a sectional view showing the hydraulic pressure control valve according to the second embodiment, when the communication state on the drain side is open, and the communication state on the supply side is close.
Figure 11B:
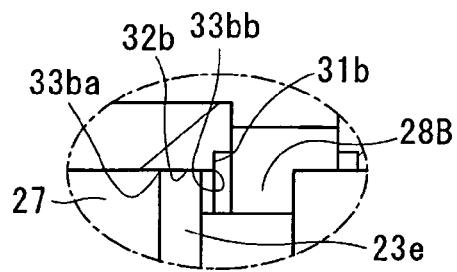
FIG. 11B is an enlarged view corresponding to the area XIB in FIG. 11A.
Figure 11C:
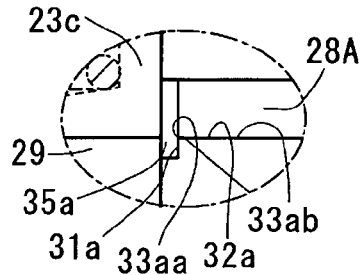
FIG. 11C is an enlarged view corresponding to the area XIC in FIG. 11A.

As shown in FIG. 10A to 10C, when the thrust force of the actuator 25 is small, the spool 13, the first hydraulic chamber 27, and the second hydraulic chambers 28A and 28B move toward the other side in the axial direction. In the present state, the first hydraulic chamber 27 and the second hydraulic chamber 28B communicate with each other. As shown in FIG. 11A to 11C, when the thrust force of the actuator 25 is large, the spool 13, the first hydraulic chamber 27, and the second hydraulic chambers 28A and 28B move toward the one side in the axial direction. In the present state, the second hydraulic chamber 28A and the third hydraulic chamber 29 communicate with each other.

The spool 13 is movable in the axial direction within the sleeve 12 thereby to cause the land 23e to control the communication state on the supply side through the first and second hydraulic chambers 27, 28A, 28B. Similarly, the spool 13 is movable in the axial direction within the sleeve 12 thereby to cause the land 23c to control the communication state on the drain side through the second and third hydraulic chambers 28A and 29.

As shown in FIG. 11A to 11C, similarly to the hydraulic pressure control valve 1 according to the first embodiment, the inner circumferential periphery of the sleeve 12 has the step portion 31a. The step portion 31a is defined by an end of the third port 18 on the other side in the axial direction. The step portion 31a and the land 23c form the drain side throttle 35a therebetween. Similarly to the first embodiment, the inner circumferential periphery of the step portion 31a on the other side in the axial direction has the seat region 32a. In the second embodiment, instead of the land 23a, the land 23c makes contact with and moves away from the seat region 32a.

As shown in FIG. 10A to 10C, similarly to the hydraulic pressure control valve 1 according to the first embodiment, the inner circumferential periphery of the sleeve 12 has the step portion 31b. The step portion 31b is defined by an end of the intermediate port 41B on the one side in the axial direction. The step portion 31b and the land 23e form the supply side throttle 35b therebetween. Similarly to the first embodiment, the inner circumferential periphery of the step portion 31b on the one side in the axial direction has the seat region 32b. In the second embodiment, instead of the land 23b, the land 23e makes contact with and moves away from the seat region 32b. The land 23e is movable away from the boundary 33bb toward the other side in the axial direction, thereby to change the communication state on the supply side from close to open. When the communication state on the supply side is open, hydraulic fluid flows from the boundary 33ba toward the boundary 33bb.

Figure 12:
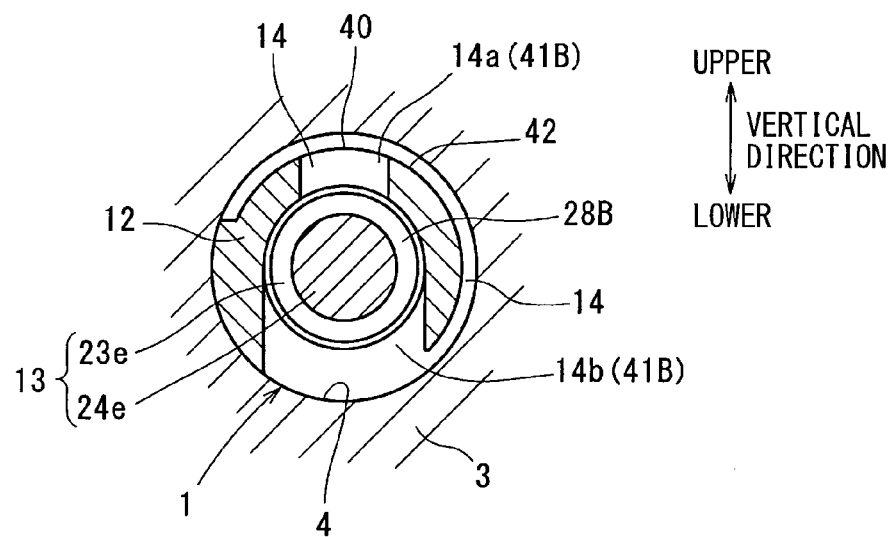
FIG. 12 is a sectional view taken along the line XII-XII in FIG. 9 and showing the hydraulic pressure control valve according to the second embodiment.

The supply-side hydraulic passage 14 according to the second embodiment conducts hydraulic fluid from the second hydraulic chamber 28B into the outlet port 7 through the intermediate port 41B, the groove 40, the intermediate port 41A, the second hydraulic chamber 28A, and the second port 17. In addition to the intermediate port 41B opening upward to the groove 40, another intermediate port 41B opens downward. In the present configuration, the intermediate port 41B is formed on each of the upper side and the lower side. As shown in FIG. 12, the outer circumferential periphery of the sleeve 12 has a groove 42 in an annular shape (C-shape). The groove 42 overlaps with the full-open range of the intermediate port 41B on each of the upper and lower sides. The groove 42 intersects with the groove 40.

In the present configuration, the intermediate ports 41B on the upper side and the lower side have the outflow holes 14a and 14b, respectively, from which hydraulic fluid flows from the second hydraulic chamber 28B. That is, the supply-side hydraulic passage 14 forms the two outflow holes 14a and 14b in the second hydraulic chamber 28B and communicates with the second hydraulic chamber 28B through the two outflow holes 14a and 14b. Hydraulic fluid flows from the outflow holes 14a and 14b, which correspond to the intermediate ports 41B on the upper side and lower side. The hydraulic fluid once flows out of the sleeve 12, and thereafter again returns through the intermediate port 41A into the second hydraulic chamber 28A in the sleeve 12. The hydraulic fluid further flows out through the second port 17 into the outlet port 7. That is, dissimilarly to the outflow holes 14*a* and 14*b* according to the first embodiment, the outflow holes 14*a* and 14*b* of the second embodiment do not function as the second port 17.

The outflow hole 14*b*, which corresponds to the intermediate port 41B on the lower side, is directed in a direction substantially the same as directions of the supply port 6 and the outlet port 7. The outflow hole 14*a*, which corresponds to the intermediate port 41B on the upper side, is at 180 degrees relative to the direction of the outflow hole 14*b*. In the present configuration of the supply-side hydraulic passage 14 according to the second embodiment, hydraulic fluid flows out through the outflow hole 14*a* upward and further flows into the groove 40. In addition, hydraulic fluid flows though the outflow hole 14*b* downward and further flows annularly through the groove 42 upward. The hydraulic fluid further flows into the groove 40 and merges with hydraulic fluid flowing out from the outflow hole 14*a*. The hydraulic fluid further flows into the second hydraulic chamber 28A.

The outflow hole 14*b* has an opening area relative to the groove 42 and the opening area of the outflow hole 14*b* is substantially the same as an opening area of the outlet port 7. The outflow hole 14*a* has an opening area relative to the groove 42, and the opening area of the outflow hole 14*a* is in a range between ⅓ and ⅔ of the opening area of the outflow hole 14*b* relative to the groove 42.

Figure 13:
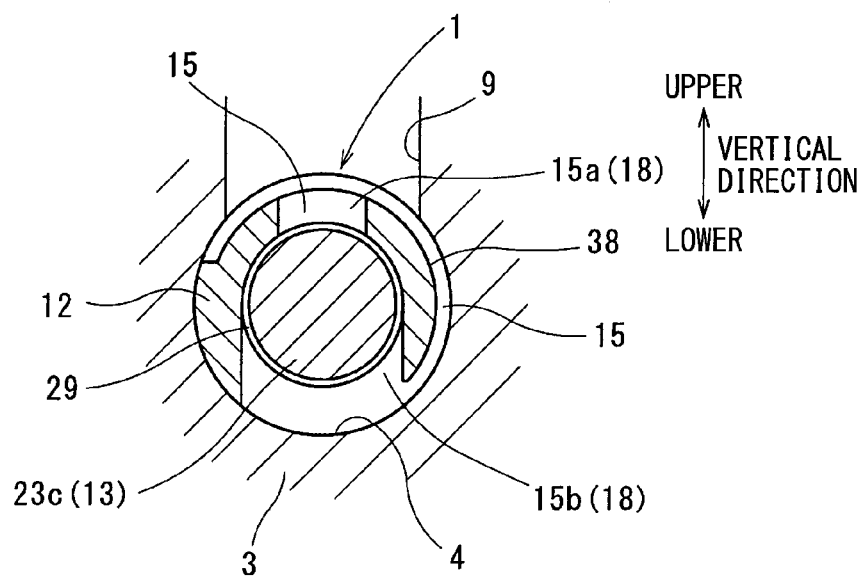
FIG. 13 is a sectional view taken along the line XIII-XIII in FIG. 9 and showing the hydraulic pressure control valve according to the second embodiment.

As shown in FIG. 13. the drain-side hydraulic passage 15 according to the second embodiment has a configuration similar to that of the drain-side hydraulic passage 15 according to the first embodiment.

As described above, in the hydraulic pressure control valve 1 according to the second embodiment, the opening area and the direction of the outflow holes 14*a* and 14*b*, flow resistance in the supply-side hydraulic passage 14, and/or the like may be determined, such that the hydraulic lateral force working on the spool 13 in the radial direction substantially becomes zero. Similarly to the first embodiment, in the hydraulic pressure control valve 1 according to the second embodiment, the sticking tendency and the hysteresis in the operating characteristic can be significantly reduced.

Furthermore, according to the configuration of the second embodiment, when the communication state on the supply side is open, hydraulic fluid flows from the boundary 33*ba* toward boundary 33*bb*. In the present configuration, when the communication state on the supply side is open, hydraulic fluid is jetted from the supply side throttle 35*b* to apply a dynamic pressure on the spool 13 hereby to render the communication state on the supply side open. In the present configuration, the force (spring force) for manipulating the spool 13 to the open side about a communication state on the supply side can be reduced.

(Modification)

The configuration of hydraulic pressure control valve 1 is not limited to those in the above-described embodiments and may employ various modifications.

In the first and second embodiments, the hydraulic pressure control valve 1 is configured to implement both of supply of hydraulic fluid into the controlled object 2 and drain of hydraulic fluid from the controlled object 2. Alternatively, the hydraulic pressure control valve 1 may be configured to implement only one of supply of hydraulic fluid into the controlled object 2 and drain of hydraulic fluid from the controlled object 2.

In the hydraulic pressure control valve 1 according to the first and second embodiments, the supply-side hydraulic passage 14 has the two outflow holes 14*a* and 14*b*, and the drain-side hydraulic passage 15 has the two outflow holes 15*a* and 15*b*. Alternatively, the hydraulic pressure control valve 1 may have the supply-side hydraulic passage 14 having three or more outflow holes and/or may have the drain-side hydraulic passage 15 having three or more outflow holes.

The configurations of the supply-side hydraulic passage 14 and the drain-side hydraulic passage 15 are not limited to those of the first and second embodiments and may have various modifications. For example, a configuration may be employed to have the first and second hydraulic chambers 27 and 28 and to have the supply-side hydraulic passage 14 having the two outflow holes 14*a* and 14*b*, similarly to the first embodiment. In this configuration, the outflow holes 14*a* and 14*b* may be shifted relative to each other in the axial direction and may be opened to the second hydraulic chamber 27.

According to one of the present disclosure, the hydraulic pressure control valve is a valve device configured to supply hydraulic fluid to the controlled object of a hydraulic pressure. The hydraulic pressure control valve is equipped to the tubular cavity to which the supply port and the outlet port open. The supply port is connected to the supply source of hydraulic fluid. The outlet port is connected to the hydraulic pressure chamber of the controlled object.

The hydraulic pressure control valve includes the sleeve, the spool, and the supply-side hydraulic passage, as follows. The sleeve is in a tubular shape and has the first port and the second port communicating with the supply port and the outlet port, respectively, when the sleeve is equipped to the cavity. The spool includes the land, which is slidable in the axial direction and supported by the inner circumferential periphery of the sleeve. The spool forms the hydraulic chamber of hydraulic fluid with the inner circumferential periphery of the sleeve.

The spool is configured to be displaced in the axial direction in the sleeve to cause the land to control the communication state between the first port and the second port through the hydraulic chamber. The supply-side hydraulic passage forms the multiple outflow holes in the hydraulic chamber to be connected with the hydraulic chamber to conduct hydraulic fluid from the hydraulic chamber through the second port to the outlet port.

In the present configuration, hydraulic fluid flowing into the hydraulic chamber is distributed in the circumferential direction to flow out through the multiple outflow holes. Therefore, the quantity of the hydraulic lateral force and the direction of the hydraulic lateral force working on the spool in the hydraulic chamber can be controlled according to the number of the outflow holes, the area of the outflow holes, the direction of the outflow holes, and various parameters, such as a flow resistance in the passage from each outflow hole to the outlet port. The present configuration enables to reduce an influence of the hydraulic lateral force exerted on the operating characteristic of the hydraulic pressure control valve when hydraulic fluid is supplied to the controlled object.

According to another aspect of the present disclosure, the hydraulic pressure control valve is a valve device configured to drain hydraulic fluid from the controlled object of hydraulic pressure. The hydraulic pressure control valve is equipped to the tubular cavity to which the outlet port and the drain port open. The outlet port is connected to the hydraulic pressure chamber of the controlled object. The drain port is connected to the drain destination of hydraulic fluid.

The hydraulic pressure control valve includes the sleeve, the spool, and the drain-side hydraulic passage, as follows. The sleeve is in a tubular shape and has the second port and the third port communicating with the outlet port and the drain port, respectively, when the sleeve is equipped to the cavity. The spool includes the land, which is slidable in the axial direction and supported by the inner circumferential periphery of the sleeve. The spool forms the hydraulic chamber of hydraulic fluid with the inner circumferential periphery of the sleeve.

The spool is configured to be displaced in the axial direction in the sleeve to cause the land to control the communication state between the second port and the third port through the hydraulic chamber. The drain-side hydraulic passage forms the multiple outflow holes in the hydraulic chamber to be connected with the hydraulic chamber to conduct hydraulic fluid from the hydraulic chamber through the third port to the drain port. Similarly to the one aspect of the present disclosure, the present configuration enables to reduce an influence of the hydraulic lateral force exerted on the operating characteristic of the hydraulic pressure control valve when hydraulic fluid is drained from the controlled object.

According to another aspect of the present disclosure, the multiple outflow holes function as the second port and the third port, respectively. The present configuration does not need an outflow hole, which is for reducing the hydraulic lateral force, separately from the second port and the third port. Therefore, the configuration and manufacturing of the hydraulic pressure control valve can be simplified.

According to another aspect of the present disclosure, the two outflow holes are connected with the hydraulic chamber. One of the two outflow hole is directed substantially in the same direction as the direction of the outlet port. The other of the two outflow hole is directed in the direction, which is at 180 degrees relative to the direction of the outlet port. The other of the two outflow holes has the opening area, which is substantially the same as the opening area of the outlet port. The one of the two outflow holes has the opening area, which is in the range between ⅓ and ⅔ of the opening area of the other of the two outflow holes. In the present configuration of the hydraulic pressure control valve having the minimum number of the two outflow holes to supply hydraulic fluid to the controlled object, influence of stress caused by hydraulic fluid can be reduced at maximum.

According to another aspect of the present disclosure, the two outflow holes are connected with the hydraulic chamber. One of the two outflow holes is directed substantially in the same direction as the direction of the outlet port. The other of the two outflow holes is directed in the direction, which is at 180 degrees relative to the direction of the outlet port. The other of the two outflow holes has the opening area, which is substantially the same as the opening area of the outlet port. The one of the two outflow holes has the opening area, which is in the range between ⅓ and ⅔ of the opening area of the other of the two outflow holes. The present configuration of the hydraulic pressure control valve to draw hydraulic fluid from the controlled object enables to produce a similar effect to the effect described above.

According to another aspect of the present disclosure, the inner circumferential periphery of the sleeve has the seat region. The seat region is slidably in contact with the land when the communication state on the supply side is close. The seat region is not slidably in contact with the land when the communication state on the supply side is open. The communication state on the supply side is the communication state between the first port and the second port. The seat region is defined by the boundary, which is on the one side in the axial direction, and the boundary, which is on the other side in the axial direction. Hydraulic fluid, which flows from the first port to the second port, passes from the boundary on the other side toward the boundary on the one side when the communication state on the supply side is open.

The land is configured to move away from the boundary on the other side toward the other side in the axial direction to change the communication state on the supply side from close to open. The present configuration reduces the hydraulic passage, which extends from the first port toward the second port when the communication state on the supply side is open, to be substantially minimum. In the present configuration, pressure loss of hydraulic fluid can be reduced.

According to another aspect of the present disclosure, hydraulic fluid, which flows from the first port to the second port, passes from the boundary on the one side toward the boundary on the other side when the communication state on the supply side is open. The land is configured to move away from the boundary on the other side toward the other side in the axial direction to change the communication state on the supply side from close to open. In the present configuration, hydraulic fluid is jetted through the gap between the periphery of the land and the seat region to apply dynamic pressure on the spool to incline the communication state on the supply side to open, when the communication state on the supply side is open. The present configuration enables to reduce a force to move the spool to render the communication state on the supply side open.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A hydraulic pressure control valve configured to be equipped to a tubular cavity, to which a supply port and an outlet port are open, the supply port being connected to a supply source of hydraulic fluid, the outlet port being connected to a hydraulic pressure chamber of a controlled object, the hydraulic pressure control valve configured to control a communication state between the supply port and the outlet port to supply hydraulic fluid to the controlled object and to control a hydraulic pressure in the controlled object, the hydraulic pressure control valve comprising:
a tubular sleeve having a first port and a second port, which communicate with the supply port and the outlet port, respectively, when the tubular sleeve is equipped to the cavity;
a spool including a land, which is slidable in an axial direction, to form a hydraulic chamber of hydraulic fluid with the inner circumferential periphery of the sleeve, the spool configured to be displaced in the axial direction in the sleeve to cause the land to control a communication state between the first port and the second port through the hydraulic chamber; and a supply-side hydraulic passage forming a plurality of outflow holes in the hydraulic chamber and connecting with the hydraulic chamber to conduct hydraulic fluid from the hydraulic chamber through the second port to the outlet port, wherein the plurality of outflow holes comprises a first outflow hole and a second outflow hole, the first outflow hole is arranged such that hydraulic fluid will flow in a radial direction away from the spool and towards the outlet port;

the second outflow hole is arranged on the opposite side of the spool and directs fluid to flow in a radial direction away from the spool and the outlet port;

the second outflow hole is connected with the outlet port in a circumferential direction of the spool, the first outflow hole is connected with the outlet port, the second outflow hole has a total opening area which is greater than a total opening area of the first outflow hole, and the first outflow hole and the second outflow hole are defined by the tubular sleeve.

2. The hydraulic pressure control valve according to claim 1, wherein the plurality of outflow holes communicate as the second port.

3. The hydraulic pressure control valve according to claim 2, wherein the plurality of outflow holes are connected with the hydraulic chamber, the second outflow hole has the opening area, which is substantially same as an opening area of the outlet port, and the first outflow hole has the opening area, which is in a range between ⅓ and ⅔ of the opening area of the second outflow hole.

4. The hydraulic pressure control valve according to claim 1, wherein the inner circumferential periphery of the sleeve has a seat region, the seat region is slidably in contact with the land when a communication state on a supply side is close, the seat region is not slidably in contact with the land when the communication state on the supply side is open, the communication state on the supply side is the communication state between the first port and the second port, the seat region is defined by a boundary on one side in the axial direction and a boundary on an other side in the axial direction, hydraulic fluid, which flows from the first port to the second port, is caused to pass from the boundary on the one side toward the boundary on the other side, when the communication state on the supply side is open, and the land is configured to move away from the boundary on the other side toward the other side in the axial direction and to change the communication state on the supply side from close to open.

5. The hydraulic pressure control valve according to claim 1, wherein the inner circumferential periphery of the sleeve has a seat region, the seat region is slidably in contact with the land when a communication state on a supply side is close, the seat region is not slidably in contact with the land when the communication state on the supply side is open, the communication state on the supply side is the communication state between the first port and the second port, the seat region is defined by a boundary on one side in the axial direction and a boundary on an other side in the axial direction, hydraulic fluid, which flows from the first port to the second port, is caused to pass from the boundary on the one side toward the boundary on the other side, when the communication state on the supply side is open, and the land is configured to move away from the boundary on the other side toward the other side in the axial direction and to change the communication state on the supply side from close to open.

6. The hydraulic pressure control valve according to claim 1, wherein the sleeve has an outer circumferential periphery defining an annular groove that connects the second outflow hole with the first outflow hole and connects the second outflow hole with the outlet port in the circumferential direction.

7. The hydraulic pressure control valve according to claim 6, wherein the annular groove is in a C-shape and is closed at both ends in the circumferential direction.

8. The hydraulic pressure control valve according to claim 1, wherein the supply port and the outlet port are directed in a same direction.

9. A hydraulic pressure control valve configured to be equipped to a tubular cavity, to which an outlet port and a drain port are open, the outlet port being connected to a hydraulic pressure chamber of a controlled object, the drain port being connected to a drain destination of hydraulic fluid, the hydraulic pressure control valve configured to control a communication state between the outlet port and the drain port to drain hydraulic fluid from the controlled object and to control a hydraulic pressure in the controlled object, the hydraulic pressure control valve comprising:

a tubular sleeve having a second port and a third port, which communicate with the outlet port and the drain port, respectively, when the tubular sleeve is equipped to the cavity;

a spool including a land, which is supported by an inner circumferential periphery of the sleeve slidably in an axial direction, to form a hydraulic chamber of hydraulic fluid with the inner circumferential periphery of the sleeve, the spool configured to be displaced in the axial direction in the sleeve to cause the land to control a communication state between the second port and the third port through the hydraulic chamber; and a drain-side hydraulic passage forming a plurality of outflow holes in the hydraulic chamber and connecting with the hydraulic chamber to conduct hydraulic fluid from the hydraulic chamber through the third port to the drain port, wherein the plurality of outflow holes comprises a first outflow hole and a second outflow hole, the first outflow hole is arranged such that hydraulic fluid will flow in a radial direction away from the spool and towards the drain port;

the second outflow hole is arranged on the opposite side of the spool and directs fluid to flow in a radial direction away from the spool and the drain port;

the second outflow hole is connected with the drain port in a circumferential direction of the spool, the first outflow hole is connected with the drain port, the second outflow hole has a total opening area which is greater than a total opening area of the first outflow hole, and the first outflow hole and the second outflow hole are defined by the tubular sleeve.

10. The hydraulic pressure control valve according to claim 9, wherein the plurality of outflow holes communicate as the third port.

11. The hydraulic pressure control valve according to claim 10, wherein the plurality of outflow holes are connected with the hydraulic chamber, the second outflow hole has the opening area, which is substantially same as an opening area of the drain port, and the first outflow hole has the opening area, which is in a range between ⅓ and ⅔ of the opening area of the second outflow hole.

the inner circumferential periphery of the sleeve has a seat region, the seat region is slidably in contact with the land when a communication state on a supply side is close, the seat region is not slidably in contact with the land when the communication state on the supply side is open, the communication state on the supply side is the communication state between the first port and the second port, the seat region is defined by a boundary on one side in the axial direction and a boundary on an other side in the axial direction, hydraulic fluid, which flows from the first port to the second port, is caused to pass from the boundary on the other side toward the boundary on the one side, when the communication state on the supply side is open, and the land is configured to move away from the boundary on the other side toward the other side in the axial direction and to change the communication state on the supply side from close to open.

12. The hydraulic pressure control valve according to claim 9, wherein the sleeve has an outer circumferential periphery defining an annular groove that connects the second outflow hole with the first outflow hole and connects the second outflow hole with the drain port in the circumferential direction.

13. The hydraulic pressure control valve according to claim 12, wherein the annular groove is in a C-shape and is closed at both ends in the circumferential direction.

* * * * *